(12) United States Patent
Anguiano

(10) Patent No.: US 7,912,824 B2
(45) Date of Patent: Mar. 22, 2011

(54) PROCESSES AND SYSTEMS FOR ENHANCING AN ELECTRONIC PROGRAM GUIDE DISPLAYING PARTICULAR TIMESLOT ASSOCIATED WITH FIRST CHANNEL AND THE LINK IS NOT ASSOCIATED WITH OTHER TIMESLOTS

(75) Inventor: Jason Anguiano, Castle Rock, CO (US)

(73) Assignee: EchoStar Technologies L.L.C., Englewood, CA (US)

( * ) Notice: Subject to any disclaimer, the term of this patent is extended or adjusted under 35 U.S.C. 154(b) by 272 days.

(21) Appl. No.: 11/932,559

(22) Filed: Oct. 31, 2007

(65) Prior Publication Data

US 2009/0112930 A1 Apr. 30, 2009

(51) Int. Cl.
*G06F 17/30* (2006.01)
*G06F 17/00* (2006.01)
*G06F 13/00* (2006.01)
*G09G 5/00* (2006.01)

(52) U.S. Cl. ............ 707/705; 707/609; 725/39; 725/40; 345/594; 345/1.2

(58) Field of Classification Search .................... 707/10, 707/102, 104.1, 609, 705–709, 723; 348/563–564, 348/569; 725/42, 46–47, 39–40, 51–52, 725/61; 345/594, 619, 650, 676, 689, 1.2
See application file for complete search history.

(56) References Cited

U.S. PATENT DOCUMENTS

| 5,479,268 | A | * | 12/1995 | Young et al. | 386/291 |
| 5,629,733 | A | * | 5/1997 | Youman et al. | 725/53 |
| 6,130,726 | A | * | 10/2000 | Darbee et al. | 348/734 |
| 6,151,059 | A | * | 11/2000 | Schein et al. | 725/37 |
| 6,243,142 | B1 | * | 6/2001 | Mugura et al. | 348/564 |
| 6,483,548 | B1 | * | 11/2002 | Allport | 348/564 |
| 6,631,523 | B1 | * | 10/2003 | Matthews et al. | 725/53 |
| 6,665,870 | B1 | * | 12/2003 | Finseth et al. | 725/40 |
| 6,701,526 | B1 | * | 3/2004 | Trovato | 725/39 |

(Continued)

FOREIGN PATENT DOCUMENTS

WO WO 97/18670 * 5/1997

(Continued)

OTHER PUBLICATIONS

Janet Greco "Data Preparation for Interactive Electronic Program Guides",International Broadcasting Convention, Sep. 12-16, 1996, pp. 294-297.*

Jgrgen Rosengren,Electronic Programme Guides and Service Information, Philips J. Res. 50 (1996) 253-265.*

*Primary Examiner* — Srirama Channavajjala
(74) *Attorney, Agent, or Firm* — Dorsey & Whitney LLP

(57) ABSTRACT

A process of displaying program information on a viewing screen may include: providing an electronic programming guide, the electronic program guide divided into timeslots containing program information; displaying program information from the displayed timeslots on a viewing screen; providing a link to additional information, the link associated with the program information of a particular timeslot; and displaying the additional information upon receiving a user input while displaying the program information of a particular timeslot. A related system may include: a client device configured to receive and display audio-visual programs; an electronic programming guide including a link to additional information associated with the program information of a particular timeslot; and a processor configured to display program information from the displayed timeslots on a viewing screen and to display the additional information on the viewing screen upon receiving a user input while the program information of the particular timeslot is displayed.

24 Claims, 6 Drawing Sheets

U.S. PATENT DOCUMENTS

| | | | |
|---|---|---|---|
| 6,934,964 B1 * | 8/2005 | Schaffer et al. | 725/46 |
| 6,970,641 B1 * | 11/2005 | Pierre et al. | 386/239 |
| 6,990,677 B1 * | 1/2006 | Pietraszak et al. | 725/49 |
| 2002/0078450 A1 * | 6/2002 | Bennington et al. | 725/41 |
| 2003/0208756 A1 * | 11/2003 | Macrae et al. | 725/34 |
| 2003/0208758 A1 * | 11/2003 | Schein et al. | 725/42 |
| 2004/0194141 A1 * | 9/2004 | Sanders | 725/53 |
| 2007/0250864 A1 * | 10/2007 | Diaz Perez | 725/52 |
| 2008/0127265 A1 * | 5/2008 | Ward et al. | 725/42 |

FOREIGN PATENT DOCUMENTS

| | | | |
|---|---|---|---|
| WO | WO 02/067579 | * | 8/2002 |
| WO | WO 02/086691 | * | 10/2002 |
| WO | WO 02/102032 | * | 12/2002 |
| WO | WO 2007/010433 | * | 1/2007 |
| WO | WO 2008/138405 | * | 11/2008 |

* cited by examiner

US 7,912,824 B2

PROCESSES AND SYSTEMS FOR ENHANCING AN ELECTRONIC PROGRAM GUIDE DISPLAYING PARTICULAR TIMESLOT ASSOCIATED WITH FIRST CHANNEL AND THE LINK IS NOT ASSOCIATED WITH OTHER TIMESLOTS

TECHNICAL FIELD

The inventive filed relates generally to electronic program guides (EPGs) used by a client device, such as a set top box (STB), digital video recorder (DVR) or similar device. The inventive field also relates to providing an enhanced electronic program guide for such devices.

BACKGROUND DISCUSSION

The proliferation of subscription television programming, the increasing number of available channels, and the corresponding increase in television programming have led to continued development of onscreen program directories and guides. Such onscreen programming solutions, collectively referred to herein as electronic program guides, have ranged from program information for each channel scrolling vertically across the screen to user controllable interfaces that allow users to examine scheduling information describing television programs currently on-air and to be broadcast in the future.

In direct broadcast satellite (DBS) systems, EPG information is periodically downloaded and updated, usually at regular intervals. Prior art approaches have allowed users to examine scheduling information that has been downloaded to the client device, either by scrolling sequentially through listings corresponding to one-half hour or hour increments or by directly accessing individual timeslots. Further, some EPGs may allow a user to directly access desired programs or even set programs to be recorded automatically.

Known EPGs provide access to program information in various ways. EPGs generally provide only program information, such as the channel, the time slot and duration, and the title of the program. Other information about the program, such as a brief description of the content and/or the names of the actors, may also be presented. Known EPGs also provide limited user interactivity, such as moving between time slots to view program information and setting current or future programs for recording.

SUMMARY

Conventional EPGs may not provide access to additional information that may be of interest to the user. Thus, there is a need to provide access to additional information via an EPG. Also, there is a need to provide additional functionality and/or user interactivity via an EPG.

Various embodiments relate to systems and processes for enhancing an EPG. Enhancements may relate to providing a user with access to additional information associated with or related to a program selected by the user in the EPG. In particular, enhancements may relate to providing access to information not conventionally provided via an EPG. Enhancements may also relate to providing increased user interactivity, for example, by providing functionality not conventionally provided via an EPG.

Some embodiments may provide an enhanced EPG in the form of a system for displaying program information on a viewing screen. The system may comprise: a client device configured to receive audio-visual programs and display the programs on a viewing screen; an electronic programming guide, the electronic program guide divided into timeslots containing program information according to the programs to be received by the client device, the timeslots including current timeslots containing program information corresponding to programs being broadcast currently and future timeslots containing program information corresponding to programs scheduled for future broadcasts, the electronic program guide including a link to additional information associated with the program information of a particular timeslot; and a processor configured to display program information from the displayed timeslots on the viewing screen and to display the additional information on the viewing screen upon receiving a user input while the program information of the particular timeslot is displayed.

Some embodiments may comprise a process of providing an enhanced EPG in the form of a process of displaying program information on a viewing screen. The process may comprise: providing an electronic programming guide, the electronic program guide divided into timeslots containing program information, the timeslots including current timeslots containing program information corresponding to programs being broadcast currently and future timeslots containing program information corresponding to programs scheduled for future broadcasts; displaying program information from the displayed timeslots on a viewing screen; providing a link to additional information, the link associated with the program information of a particular timeslot; and displaying the additional information upon receiving a user input while displaying the program information of the particular timeslot.

Some embodiments may provide an enhanced EPG system in the form of a computer-readable storage medium. The medium may include instructions for: providing an electronic programming guide, the electronic program guide divided into timeslots containing program information, the timeslots including current timeslots containing program information corresponding to programs being broadcast currently and future timeslots containing program information corresponding to programs scheduled for future broadcasts; displaying program information from the displayed timeslots on a viewing screen; providing a link to additional information, the link associated with the program information of a particular timeslot; and displaying the additional information upon receiving a user input while displaying the program information of the particular timeslot.

Some embodiments may provide an enhanced EPG system in the form of a method of providing information for display on a viewing screen. The method may comprise: providing program information corresponding to programs being broadcast currently and programs scheduled for future broadcasts; providing additional information; associating the additional information with the program information via a link; and providing the additional information for display when the link is selected.

In some embodiments, the process may further comprise searching the electronic program guide for information associated with the link upon receiving the user input and displaying the additional information based on a result of the search. For example, the user input may cause the electronic program guide to be searched for additional information associated with the link. Alternatively or additionally, the process may comprise accessing additional information that is external to the electronic program guide, for example, via the Internet.

In some embodiments, the link to additional information may be displayed on the viewing screen. In such embodiments, the additional information may be displayed upon receiving a user selection of the link.

In some embodiments, the additional information may include information regarding a next broadcast of a program associated with a particular timeslot selected by the user. In such embodiments, the additional information may include a link configured to set a time for recording the next broadcast upon receiving a user selection of said link.

In some embodiments, the additional information may comprise a program scheduled for future broadcast and a link configured to set a time for recording the program scheduled for future broadcast upon receiving a user selection of said link.

In some embodiments, the additional information may comprise a link to further information. In such embodiments, the electronic programming guide may be searched for information associated with the link to further information. Alternatively or additionally, the search may be external to the electronic program guide, for example, via the Internet.

In some embodiments, the additional information may comprise purchase information for an item related to a program associated with a particular timeslot selected by the user. In such embodiments, the item may comprise at least one of a toy, a game, clothing, artwork and a physical recording medium with the video event data recorded thereon. Further, the purchase information may comprise at least one of a link and a telephone number.

In some embodiments, the additional information is based at least in part on at least one of a user profile and a user preference associated with a client device including the electronic program guide.

By using various embodiments, an enhanced EPG may provide access to additional information and may also provide additional functionality and/or user interactivity, as compared to known EPGs.

BRIEF DESCRIPTION OF THE DRAWINGS

Various details of the present invention may be better understood on reading the following detailed description of non-limiting embodiments, and on examining the accompanying drawings, in which.

DETAILED DESCRIPTION OF EMBODIMENTS

Figure 1:
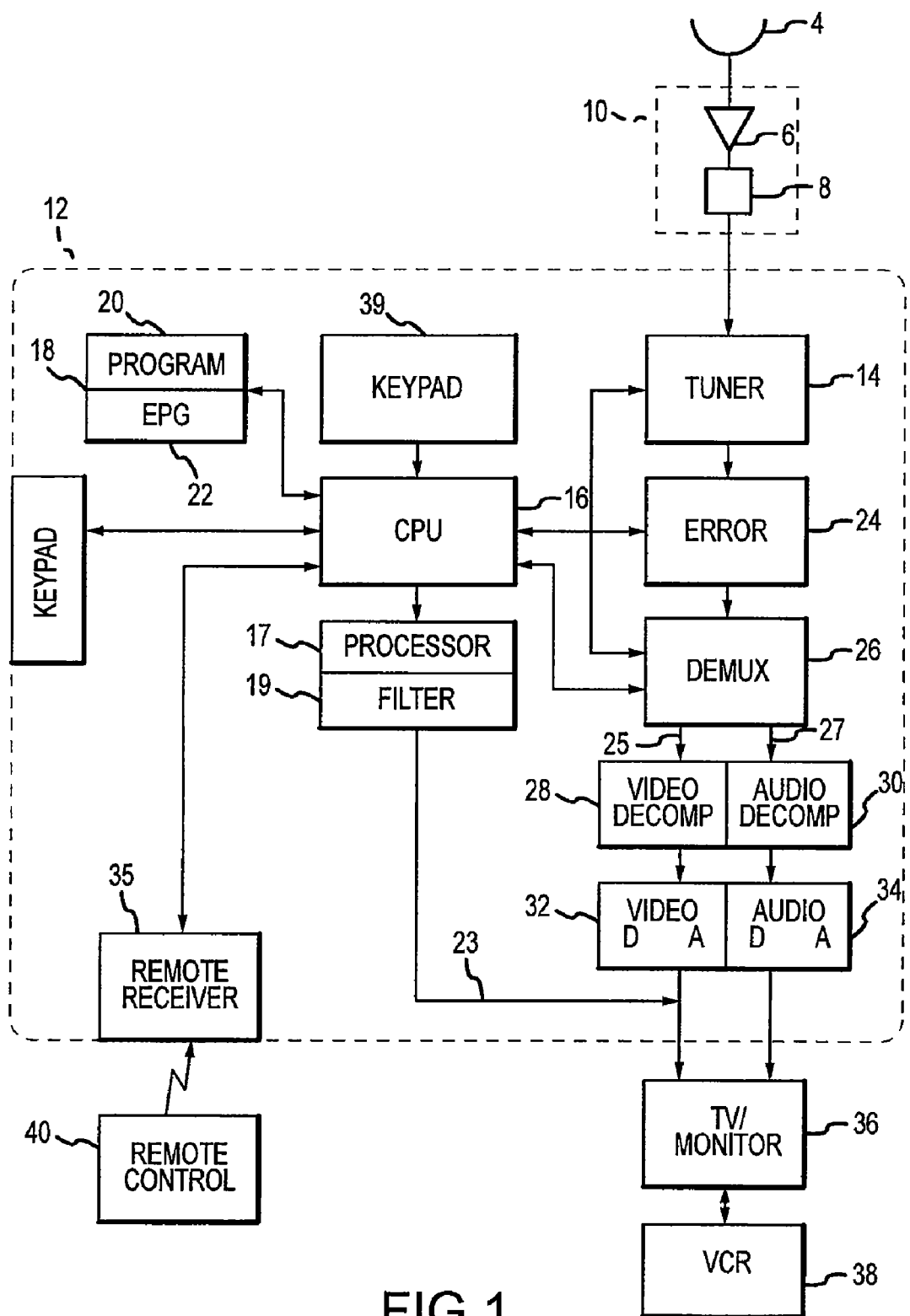
FIG. 1 is a block diagram illustrating major components of an example of a direct broadcast satellite television system.

As used herein, the terms "electronic programming guide" or "EPG" are intended to encompass an interface provided to a user and an underlying television broadcast system or component that supports functionality with the programming content. The enhanced EPG described herein may be considered to be embodied in the interface, a display, such as a televisions or monitor, software and/or hardware, either alone or in combination. As such, the term EPG is used in a broad sense for the sake of clarity in the description, without being limiting.

The embodiments shown in the Figures illustrate processes and systems that may provide an enhanced EPG. Enhancements may relate to providing a user with access to additional information and/or functionality related to a program selected by the user in the EPG.

The additional information may be associated with the program information of a particular program. For example, typical program information includes elements such as a title, a brief description of the program content, a date and a list of actors or participants. The additional information may be associated with any of the program information elements or sub-elements, such as the title, a word in the brief description, the date, or individual actors, directors, etc. Thus, the additional information may be related to the elements per se rather than merely to the program itself.

Additional information may be linked to the particular elements, as appropriate or desired, such that corresponding additional information is displayed when a link associated with a particular element is selected. For example, the title may be linked to other programs with related titles, or similar themes or content. The other programs may be programs that are or will be available for viewing, for example, via broadcast.

In addition to other programs, the elements of the program information may be linked to non-program information. For example, an individual actor may be linked to information about that actor, such as biographical information, a listing of roles played, current gossip, current projects, photographs, etc. A word in the brief description may be linked to program or non-program information having that word as a topic. For example, if the word is a sport, such as football, or a particular sports team, the word may be linked to football information or the information regarding the particular sports team. Alternatively or additionally, the word may be linked to football programs or programs featuring the particular sports team, players, coaches, etc.

The additional information may be other showings of the particular program, trivia information, or any other information that may be of interest to a user interested in the program. Thus, it should be understood that the types of additional information that may be linked to the elements of the program information is virtually unlimited. Also, the additional information may be linked to further information. As such, any number of links and/or series of links may be provided.

In particular, links to additional information may provide enhanced functionality, by allowing a user to perform functions other than the display of information. For example, the links to additional information may allow timers to be set to record programs. The links may also allow purchases to be made, for example, of programs, services or merchandise.

Various implementations are possible. For example, satellite, cable, internet or other broadcasting technologies may be suitable. Thus, while the following description provides an example in the context of a satellite broadcast system, it should be understood that such description is not limiting.

Figure 5:
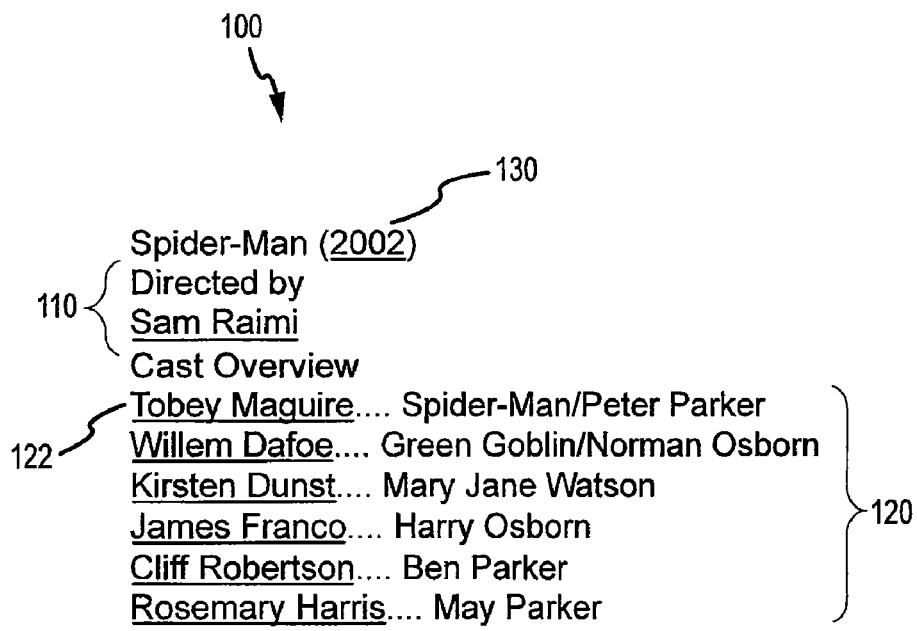
FIG. 5 is a display illustrating an example of additional information.
Figure 6:
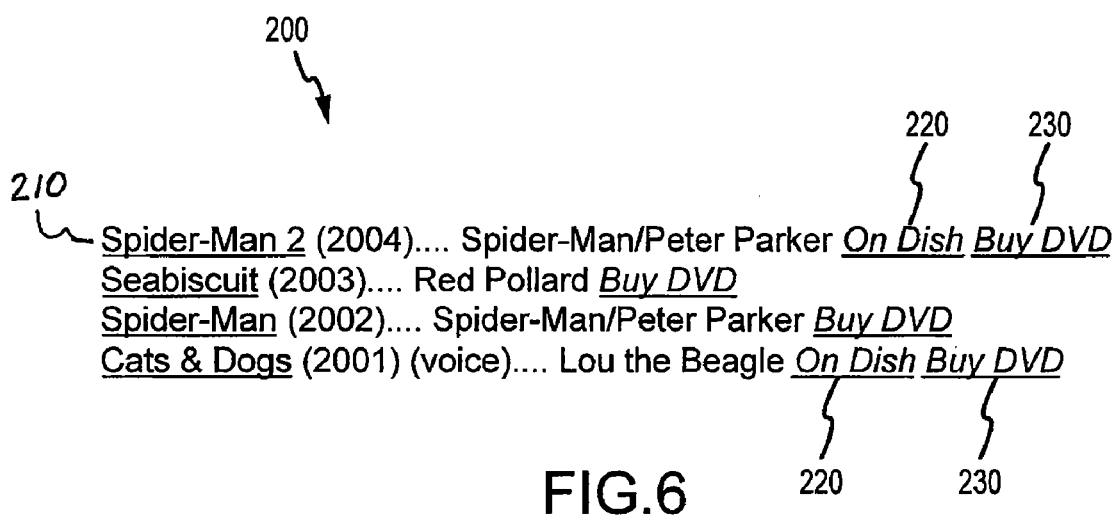
FIG. 6 is a display illustrating an example of further information.
Figure 7:
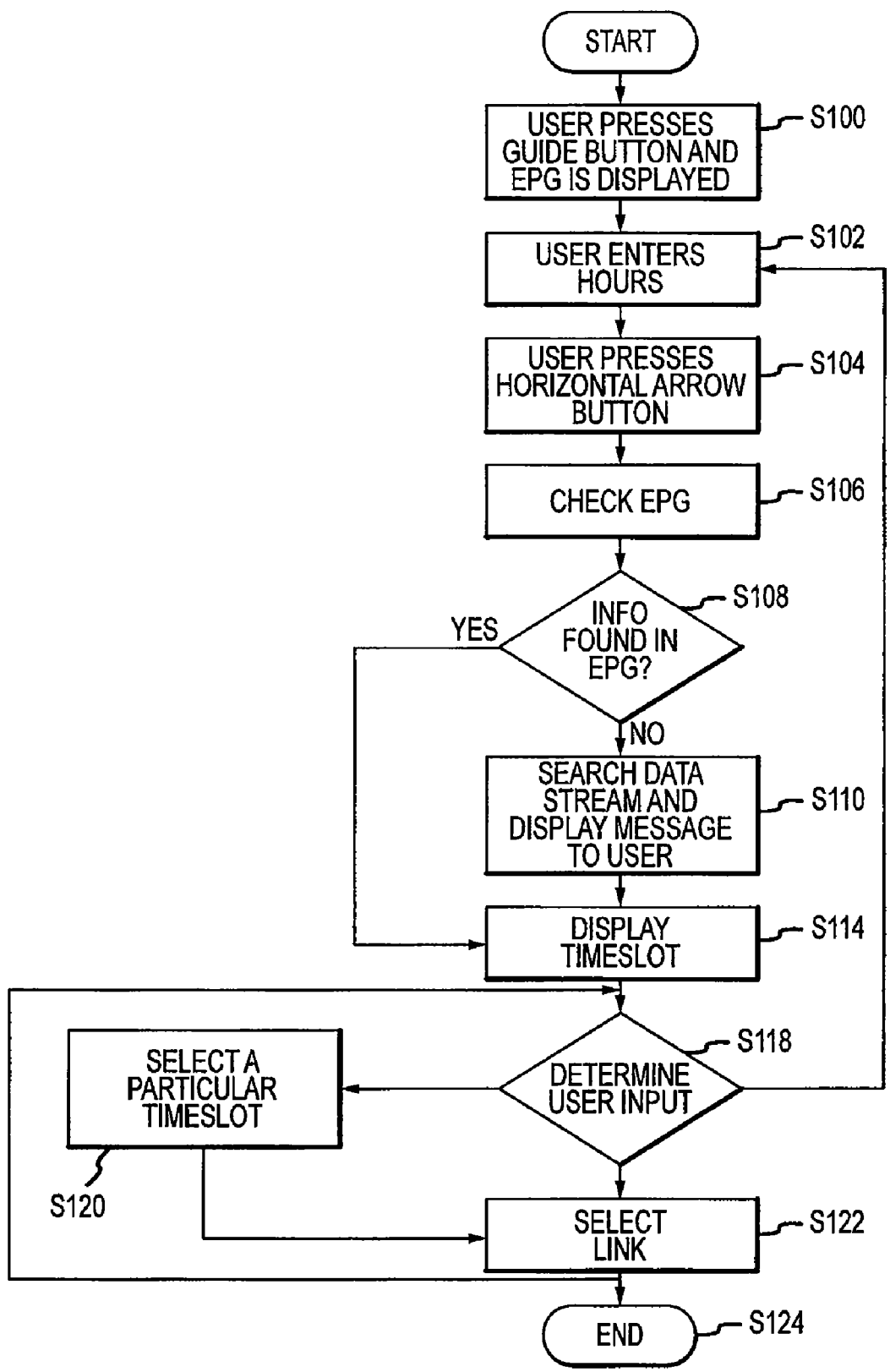
FIG. 7 is a flowchart illustrating a process of providing an enhanced EPG.

The block diagram shown in FIG. 1, the displays shown in FIGS. 2-6 and the flowchart shown in FIG. 7 are for illustration only and are not intended to represent the only possible displays, process flows and system configurations. In particular, it should be understood that process steps may be added, omitted and reordered as may be suitable to a particular application. Also, individual components may be added, omitted, replaced and interrelated as may be suitable to a particular application. All details appurtenant to implementing the exemplary processes and systems that are well understood in the art are omitted for simplicity and clarity.

FIG. 1 is a block diagram that shows various components that may be used to implement various features of the present invention. For example, a direct broadcast satellite system incorporating packetized transmission according to the MPEG-2 standard may be used, although any programming source that includes an EPG, or transmits data to be incorporated into an EPG, is contemplated. Encrypted direct broadcast satellite (DBS) signals may be received as downlinked signals 2 by a satellite antenna 4, such as a parabolic dish of approximately eighteen to thirty-six inches in diameter in one embodiment. Front end processing of the satellite signal may be accomplished by a low noise block converter feed (LNBF) provided in the antenna focal point. This may include a converter module 10 with a low noise amplifier 6, which receives the signals from the feed and by a down converter 8 converts the entire frequency band of the satellite signals to a lower frequency range that may be efficiently transmitted via coaxial cable to a satellite receiver 12. A tuner 14 may select a specific channel from the downlinked signal 2 and feed the selected channel to an error correction and packet synchronization module 24. The error correction and packet synchronization module 24 may output a fully compliant MPEG-2 transport stream as defined by the ISO 13818-2 MPEG specification, which may be directed to a packet demultiplexer 26. Other encoding or formats may also be used as well.

The packet demultiplexer 26 may be an integrated circuit that accepts the packetized, time domain multiplexed data stream of the MPEG-2 transport stream and routes the packets to various areas within the satellite receiver 12. Audio may be output as an audio stream 27, which may be accepted by an audio decompresser 30. Video may be output as a video stream 25, which may be accepted by a video decompresser 28. The audio stream 25 and the video stream 27 may be fully compliant audio and video program Elementary Streams as defined by ISO 13818-2 and ISO 13818-3 of the MPEG-2 standard, respectively. In addition to routing packets of data, the packet demultiplexer 26 may also descramble encrypted data, provide various buffering of the MPEG data, and handle a program clock reference to keep a local clock synchronized with the clock at the uplink center. Data 29 may be output from the demultiplexer 26 and routed to a central processing unit (CPU) 16, which may assemble the data 29 into an EPG 22 stored in a memory or other storage medium 18.

The video decompresser 28 and the audio decompresser 30 may accept one or more video stream 25 and/or audio stream 27, respectively, and decompress them into baseband digital signals. The video stream 25 may then fed to a video digital to analog converter 32 and the audio stream 27 may be fed to a video digital to analog converter 34. The converters 32 and 34 may decode the digital signals and output resulting analog baseband signals to a TV/monitor 36 and/or a VCR device 38.

The EPG 22 may comprise a database or otherwise access a database containing information including, for example, names or titles of viewing events (programs), corresponding channel numbers and names, brief descriptions of the programs, start and finish times, and rating and content information related to the events. The central processing unit 16 may execute an EPG program 20, which may take the information stored in the EPG 22 and output a graphic file to a processor 17. The processor 17 may process the graphic file and output a signal, which, after being filtered by a filter 19, may become a video baseband signal 23 that may be combined with the video baseband signal 25 to be displayed on the television/monitor 36.

A user may manipulate the satellite receiver 12 via a keypad 39 or a remote control device 40. The remote control device 40 may communicate with the CPU 16 by sending an infrared, radio frequency, or other wired or wireless signal to a remote receiver 35, which may transfer commands to the CPU 16.

The EPG program 20 may comprise an instruction set that creates the EPG 22 and allows a user to manipulate the EPG 22, as discussed further below. While the EPG program 20 may be implemented as hardware, the EPG program 20 may alternatively or additionally comprise a software program stored in the memory 18. Memory 18 may be random access memory (RAM), but also may be flash, ferroelectric, or other nonvolatile memory, or conventional RAM with a battery backup. An LSI 64002 microprocessor may be used for the central processing unit 16. Also, the processor 17 may be an NTSC processor, such as the Sony CXD 1910, or anything else suitable.

Figure 2:
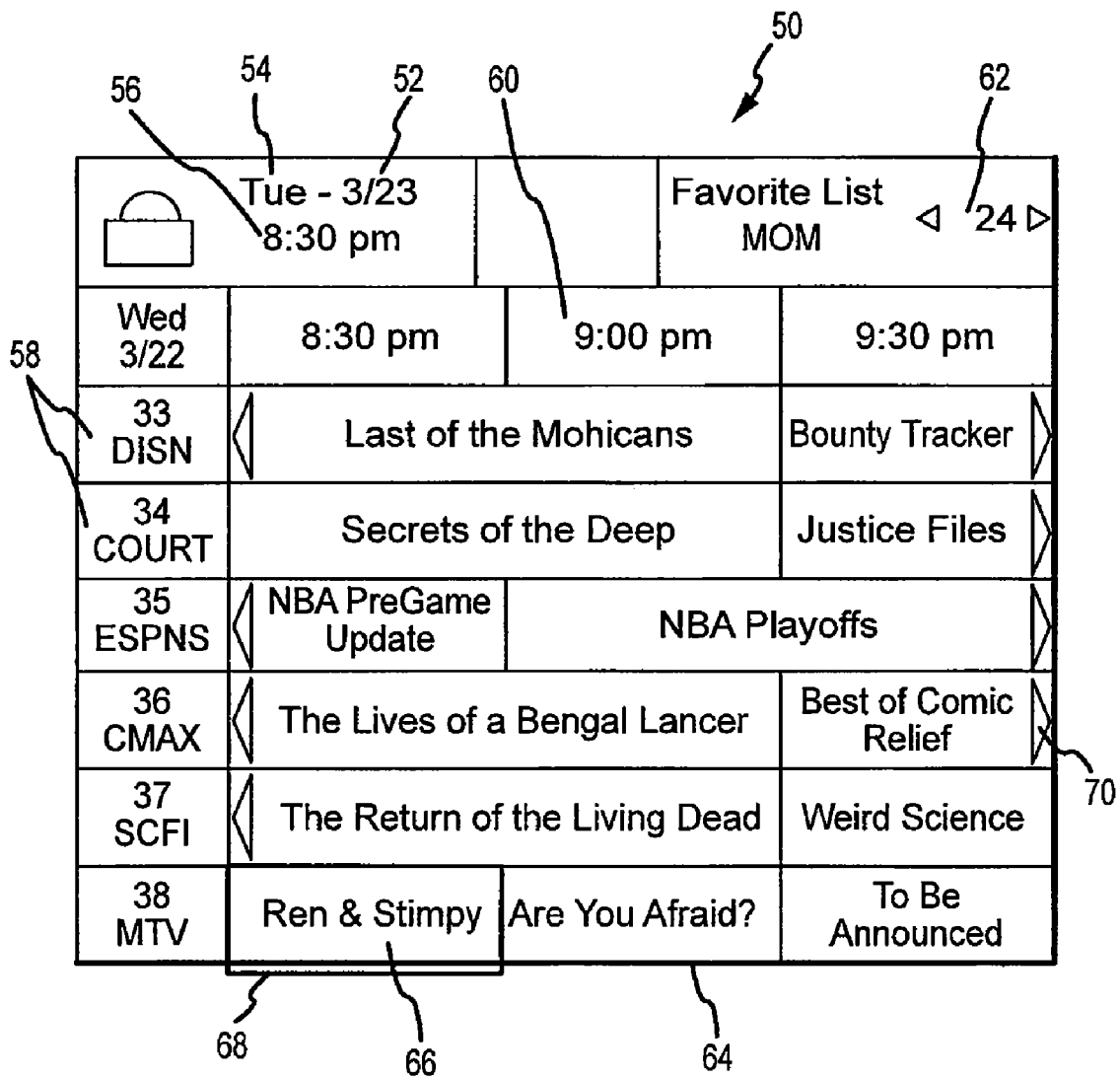
FIG. 2 is a display illustrating program selections contained in an example of an EPG.

As illustrated in FIG. 2, programming information contained in the EPG 22 may be displayed on the TV/monitor 36 in the form of a screen 50. As an example, the screen 50 may allow the user to examine programming information contained in the EPG 22 for programs scheduled for up to at least two days into the future. The user may summon the screen 50, for example, by pressing the GUIDE key on the remote control device 40 or the keypad 39.

Current date 52, day of the week 54, and time 56 may be displayed in the upper left corner of the screen 50. The screen 50 may list channels 58 in a column at the left edge of the screen, and timeslots 60 in a row across the top of the screen. For example, timeslots 60 may be divided into 30 minute intervals, but other intervals may be used. Titles or descriptions corresponding to individual programs 66 may be displayed in the center of the screen 50, in a grid 64 defined by the channels 58 and the timeslots 60. If an event has an air time exceeding the timeslot in which it is currently displayed, an arrow 70 may appear in the program that indicates the adjacent timeslot in which the event may be viewed. Upon summoning of the screen 50, a cursor 68 may be placed upon the event 66 corresponding to the programming selection currently being viewed. The cursor 68 may be implemented by drawing a box around the program 66, or highlighting the program 66. Any of the programs may be selected for viewing by moving the cursor 68 to the desired program via arrow keys located on the remote control device 40 or the keypad 39 and pressing the SELECT key, for example. If the selected event is to be shown in the future, the user may set up an event timer.

The user may traverse the channels 58 by scrolling via the vertical arrow keys on the remote control device 40 or the keypad 39. The timeslots 60 may be traversed either by scrolling via the left and right arrow keys, or by specifying a number of hours in box 62 located in the upper right corner of the screen 50. The number of hours available to the user may be dependent on the total amount of information contained in the downlink datastream.

For example, the user may traverse the timeslots 60 by entering the number of hours into the box 62 and then pressing one of the horizontal arrow keys. If the right arrow key is pressed after entering a number, the screen 50 may display the timeslot located (in this example) 24 hours later than the timeslot indicated by the cursor 68, and the cursor 68 may be moved to the program corresponding to the new timeslot and currently selected channel. If the left arrow key is pressed after entering a number, the screen 50 may display the timeslot located (in this example) 24 hours earlier than the timeslot indicated by the cursor 68, and the cursor may be moved to the program corresponding to the new timeslot and currently selected channel.

If the desired program information is not currently in memory, the system may access the information from the MPEG-2 downlink datastream. A message may appear on the TV/monitor 36 informing the user that the system is retrieving EPG information from the satellite. This may allow the user to either wait for the update or cancel the operation. If the desired information is not contained within the data stream 2, the user may be informed; otherwise, the desired information may be displayed on the TV/monitor 36 once retrieved.

In addition to such use control of displayed programming information, the EPG 22 may be enhanced to include a link to additional information. As represented in FIG. 2, the link may not be displayed to the user on the screen 50. In such case, the link may be associated with a particular key on the remote control device 40 or the keypad 39, or a sequence of keys.

For example, while the program 66 is outlined or highlighted as shown in FIG. 2, the user may press an INFO key. In response, the CPU 16 may select the link associated with the particular program 66 and retrieve additional information from the EPG 22 associated with the link. Retrieving the additional information may comprise conducting a search of data stored in the EPG 22 or directly accessing specified data from the EPG 22. For example, the EPG 22 may include a built-in browser that searches for key words. The EPG 22 may also use a program unique identifier (PUID) that is associated with each program to search for related information. For example, related programming may include similar PUIDs, such as a common series ID. A similar approach may be used by assigning an ID for each actor, director, etc. associated with a program. Retrieving the additional information may comprise, alternatively or additionally, accessing and/or searching a remote database or other source of information, for example, via the Internet.

Once retrieved, the processor 17 may cause the additional information to be displayed on the TV/monitor 36. The additional information may be displayed in addition to the program information, or may replace or overlay the program information in the display screen.

Figure 3:
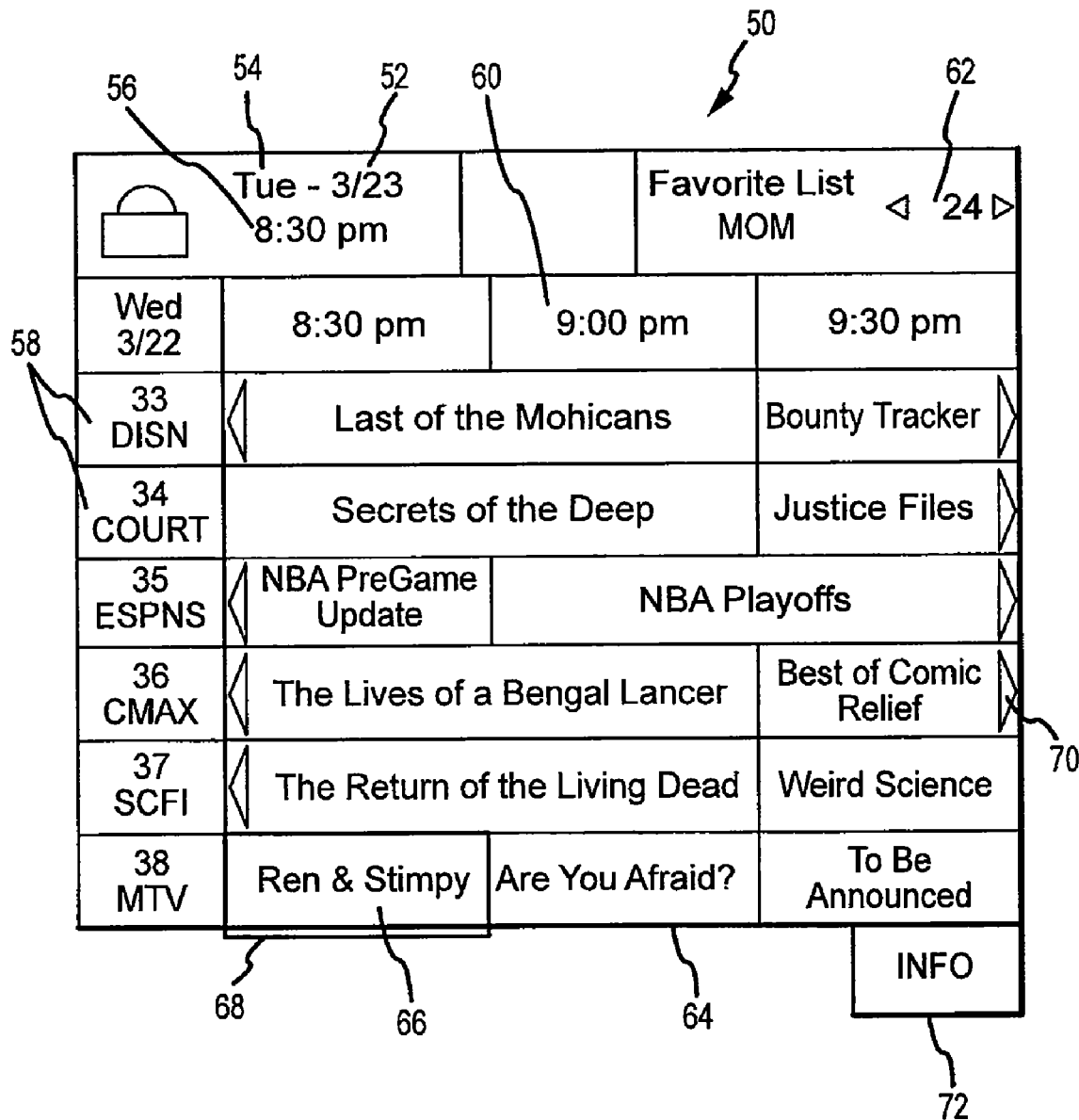
FIG. 3 is a display illustrating another example of an EPG.

FIG. 3 illustrates another example of an EPG displayed on the screen 50. In this example, a link 72 may be displayed on the screen 50 for selection by a user input, for example, using the remote control device 40 or the keypad 39. The link 72 may be associated with the program 66 that is in the particular timeslot outlined or highlighted by the cursor 68. As such, the additional information associated with the link 72 may vary based on the position of the cursor 68. Thus, the user may control the cursor 68 to identify a particular timeslot and then further select the link 72 to access additional information associated with the program 66 in that timeslot. For example, the link 72 may be automatically rendered active for selection by the user once the cursor 68 is paused on the timeslot for a certain amount of time indicating that the program 66 is of interest to the user.

Figure 4:
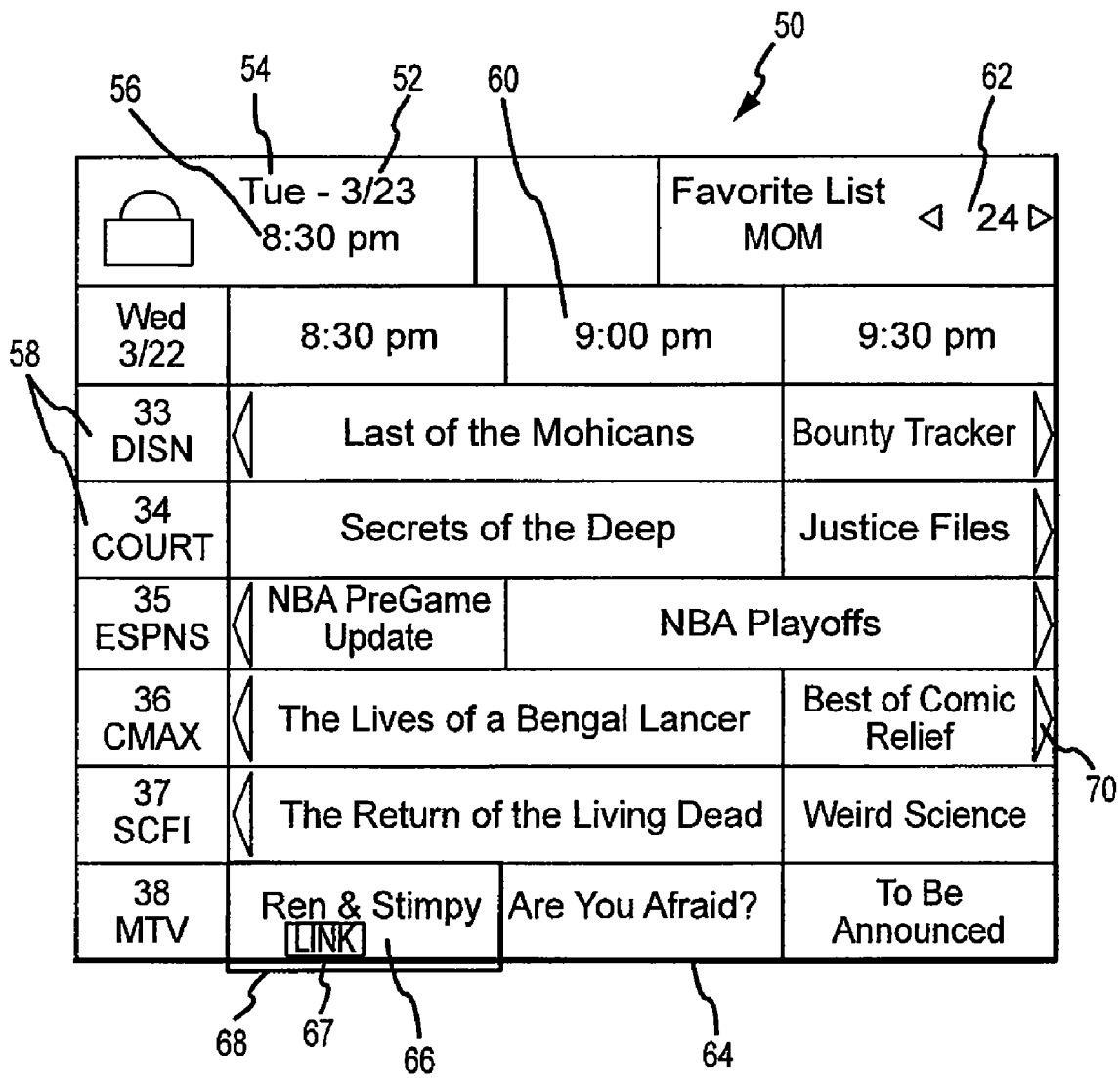
FIG. 4 is a display illustrating another example of an EPG.

FIG. 4 illustrates another example of an EPG displayed on the screen 50. In this example, a link 67 may also be displayed on the screen 50 for selection by a user input, for example, using the remote control device 40 or the keypad 39. In this case, the link 67 may be associated with the program 66 by being included in the particular timeslot. Thus, the additional information may be associated with the link 67 prior to selection, or may result from a search of the EPG or other information source upon selection of the link 67. Each of the timeslots may or may not include one or more corresponding links. Such links may be displayed on the screen 50 whenever the EPG is displayed, or may only be displayed when the particular timeslot is outlined or highlighted by the cursor 68, as suggested by FIG. 4. It should be understood that other manners of displaying and/or controlling to access to such links are not excluded. For example, user input, such as via a SELECT or INFO button on the remote control device 40 or the keypad 39, may cause another screen or pop-up including the links to be displayed. In general, any suitable display or user interaction to display the additional links may be envisioned.

The additional information may be of various sorts. For example, the link may provide a link to the next showing of the program. This may allow the user to set a timer for recording the next showing if the user missed part of the program or wishes to see the program again.

Alternatively or additionally, the link or links may be associated with additional information contained within a database. Such a database may be stored in the EPG 22 or otherwise be accessible by the client device (e.g., stored on the hard drive of a digital video recorder), or may be stored in an external database that may be accessed, for example, via the Internet. As illustrated in FIG. 5, additional information 100 may be displayed upon selection of a link associated with a program of the movie "Spider-Man." For example, the additional information 100 may include director information 110 and cast information 120, in addition to historical information 130, such as the year the movie was first released. It should be understood that, as discussed above, other programs other than movies are also contemplated, including but not limited to, television shows, sporting events, news, etc.

The additional information 100 may comprise one or more links to further information. The links may be associated with particular information (e.g., elements) contained in the additional information. In particular, the links may be displayed as part of the additional information 100, as illustrated by underlining in FIG. 5. Thus, various information included in the additional information 100 may also provide a link to further information.

As illustrated in FIG. 6, further information 200 may be displayed upon selection of a link associated with the actor Tobey Maguire 122 from the additional information 100. The further information 200 may include, for example, a listing of all movies or programs in which Tobey Maguire is an actor. As will be understood, one or more links to even further information may be associated with the further information 200, such as links 210 to additional information regarding each of the movies or programs in which Tobey Maguire is an actor.

As appropriate or desired, the selection of the link associated with the actor Tobey Maguire 122 may include a search of the EPG 22 to identify any movies that are to be broadcast in the future. In such case, the further information 200 may include links 220 that may allow the user to set a timer to record the future broadcast of the particular movie. Additionally or alternatively, the client device may be configured to record any programs including Tobey Maguire as an actor as such programs occur, for example, based on selection of one of the links 220 or some other link. The link 220 may, additionally or alternatively, allow the user to purchase the future broadcast, pay-per-view, on-demand, download, etc. of the movie and/or a DVD of the movie.

Further, as appropriate or desired, the further information 200 may include links 230 that may allow the user to purchase a DVD or other item associated with the particular movie, such as a toy, a game, clothing, artwork, etc. The links 230 may either connect the user to purchase information, such as a telephone number, or may allow a transaction by the user within the EPG/satellite framework, for example, either via satellite transmission or via a backchannel, such as a phone line or the Internet.

It will be understood that the additional information 100 and the further information 200 shown in FIGS. 5 and 6 are merely illustrative and that any sorts of information that may be of interest to the user may be provided. In particular, the additional information may be based on an analysis of the user's viewing habits and interests. The CPU 16 or another processor may track a user's viewing habits and analyze them to generate additional information and/or links to additional information that may be of interest to the user. Additionally or alternatively, the additional information and/or the links may be based on a user profile or user preferences that may be established either by the user or the broadcast service provider. In such cases, the additional information and/or the links may be customized to a particular user in addition to being associated with a particular program.

An example of other kinds of information that may be provided as additional information and/or further information relates to blackout restrictions. Blackout restrictions may prevent a particular program from being broadcast on a particular channel. For example, a blackout restriction may be employed to prevent a local sporting event to be displayed on a local or other channel. In such case, when a subscriber or user of the client device attempts to view the program by selecting that channel, a message indicating that the program and/or channel is not available due to blackout restrictions. This message or indication may be provided as EPG information.

Additional information may be provided in the form of an alternative channel or channels via which the program may be viewed and/or recorded, i.e., channel(s) that is/are not subject to the blackout restriction. In some embodiments, message or indication may provide the additional information as a link. The link may be to a list of alternative channels, or may be to a particular alternative channel, such that user selection of the link either lists the alternative channels, with or without additional links to the channels listed, or causes the particular alternative channel to be tuned in for viewing and/or recording. Such approaches to additional information may reduce user frustration due to blackout restrictions.

Referring to FIG. 7, a flowchart illustrating an example of a process of providing an enhanced EPG is shown. As will be understood, the various operations may be performed using the remote control device 40 or the keypad 39 in conjunction with the remote receiver 35, the CPU 16, the EPG 22 and the EPG program 20. Control may begin at S100, in which the user may access the EPG program 20, for example, by pressing the GUIDE key on the remote control device 40 or the keypad 39. In response, the EPG information may be displayed on the TV/monitor 36 as shown in any one of FIGS. 2-4 or otherwise. As noted above, any suitable approach for controlling access to or displaying EPG information may be employed. For example, selection of a particular key on the remote control device 40 or the keypad 39 may cause the client device to enter a "browse mode" in which only a portion of the screen is used to display EPG information while the current program is displayed in the remainder of the screen.

Control may continue to S102, in which the user may enter a number of hours corresponding to timeslots 60 he wishes to traverse. The entered number of hours may be displayed in the box 62. Control may continue to step S104, in which the user selects a button or key to indicate which direction to traverse, forward or backward. For example, if 24 is displayed in the box 62 and the user presses the right horizontal arrow button, all listings corresponding to the timeslot listed 24 hours later than the currently selected timeslot may be displayed.

Next, at S106, the EPG program 20 may check the memory 18 to see if the EPG information corresponding to the displayed timeslots is contained in the EPG 22. Then in S108, a determination as to whether or not the information is contained in the EPG 22 may be made. If so, control may jump to S114, in which the EPG program 20 may display the corresponding information in the displayed timeslots.

If not, control may continue to S110, in which the data stream 2 may be searched for the information corresponding to the displayed timeslots. Optionally, at S110, a message may be displayed to inform the user that the searching is being performed. Once the information is acquired, control may continue to S114, in which the EPG program 20 may display the corresponding information in the displayed timeslots.

Control may continue to S118, in which a user input is determined. The user input may be to enter another number of hours to display different timeslots by returning to S 102. The user input may also be to select a link by jumping to S122. For example, if additional information associated with the program of the timeslot currently highlighted or outlined is desired, the user may press the INFO or LINK key on the remote control device 40 or the keypad 39, which may correspond to selection of the link of the EPG as illustrated in FIGS. 2 or 3. For the link 67 as illustrated in FIG. 4, the user input may also include moving the cursor 68 to highlight or outline the link 67 in the particular timeslot 68.

Alternatively, at S120, the user input may be to select a particular timeslot different from the timeslot currently highlighted or outlined. As illustrated in FIGS. 2 or 3, this may change the additional information that is associated with the link of the EPG. As illustrated in FIG. 4, this may render a different link 67 visible on the display 50 and/or available for selection. Thus, after S120, control may continue to S122 to access the corresponding additional information by selecting the link.

As represented by S124, the user may terminate the process after the desired additional information has been displayed. Although not shown, it should be understood that the user may be able to terminate the process at any stage.

Further, although not shown for the sake of clarity and simplicity, it should be understood that the various features described above may be incorporated in the process. For example, selection of the link in S122 may be followed by an additional step that allows the user to select another link to further information. Accordingly, the process shown in the flowchart of FIG. 7 should be understood as being illustrative only and not limiting.

Although various details have been described herein with reference to particular embodiments, it is to be understood that these embodiments are merely illustrative of principles and applications. It is therefore to be understood that numerous modifications may be made to the illustrative embodiments and that other arrangements may be devised without departing from the spirit and scope of the present invention.

What is claimed is:

1. A process of displaying program information on a viewing screen, the process comprising:
   receiving electronic program guide data at a receiver from a datastream, the electronic program guide data divided into a plurality of channels and a plurality of timeslots associated with each channel, each timeslot containing program information, the timeslots comprising:
   current timeslots containing program information corresponding to programs being broadcast currently; and
   future timeslots containing program information corresponding to programs scheduled for future broadcasts;

receiving a first user input requesting a display of an electronic programming guide;

in response to the first user input, outputting a first signal from the receiver to a display device, the first signal causing the display device to display the program information in timeslots displayed on a viewing screen of the display device;

providing a link to additional information, the link associated with the program information of a particular timeslot displayed on the viewing screen, wherein the particular timeslot is associated with a first channel and the link is not associated with other timeslots associated with the first channel, and the additional information linked by the link is not displayed on the viewing screen in response to the first user input;

receiving a second user input selecting the link to additional information; and in response to the second user input, outputting a second signal from the receiver to the display device, the second signal causing the display device to display the additional information linked by the link on the viewing screen while displaying the program information of the particular timeslot.

2. The process of claim 1, wherein:

the particular timeslot includes a listing of a first showing of a particular program at a first time; and the additional information linked by the link comprises a listing of a second showing of the particular program at a second time, wherein the second time is after the first time.

3. The process of claim 2, wherein the additional information linked by the link further comprises a second link configured to set a timer for recording the particular program scheduled for future broadcast at the second time upon receiving a user selection of said second link.

4. The process of claim 1, further comprising performing a search for information associated with the link upon receiving the user input and displaying the additional information based on a result of the search.

5. The process of claim 4, wherein performing the search comprises searching the electronic program guide.

6. The process of claim 4, wherein the additional information comprises a program scheduled for future broadcast.

7. The process of claim 6, wherein the additional information further comprises a link configured to set a timer for recording the program scheduled for future broadcast upon receiving a user selection of said link.

8. The process of claim 1, further comprising displaying the link to additional information on the viewing screen.

9. The process of claim 8, further comprising displaying the additional information upon receiving a user selection of the link.

10. The process of claim 9, wherein:

the link is associated with a particular timeslot selected by the user; and the additional information linked by the link is associated with the program of the particular timeslot.

11. The process of claim 10, wherein the link is included in the particular timeslot.

12. The process of claim 1, wherein the additional information includes information regarding a next broadcast of a program associated with the particular timeslot.

13. The process of claim 12, wherein the additional information includes a link configured to set a time for recording the next broadcast upon receiving a user selection of said link.

14. The process of claim 1, wherein the additional information comprises a link to further information.

15. The process of claim 14, further comprising performing a search for information associated with the link to further information upon receiving a user input that selects the link and displaying the further information based on a result of the search.

16. The process of claim 14, wherein performing the search comprises searching the electronic programming guide.

17. The process of claim 1, wherein the additional information comprises purchase information for an item related to a program associated with a particular timeslot selected by the user.

18. The process of claim 17, wherein the item comprises at least one of a toy, a game, clothing, artwork and a physical recording medium with the video event data recorded thereon.

19. The process of claim 18, wherein the purchase information comprises at least one of a link and a telephone number.

20. The process of claim 1, wherein the additional information is based at least in part on at least one of a user profile and a user preference associated with a client device including the electronic program guide.

21. A system for displaying program information on a viewing screen, the system comprising:

a client device configured to receive audio-visual programs and display the programs on a viewing screen;

an electronic program guide, the electronic program guide divided into a plurality of channels and a plurality of timeslots associated with each channel, each timeslot containing program information according to the programs to be received by the client device, the timeslots comprising:

current timeslots containing program information corresponding to programs being broadcast currently; and future timeslots containing program information corresponding to programs scheduled for future broadcasts, the electronic program guide being displayed in response to a first user input, the electronic program guide including a link to additional information associated with the program information of a particular timeslot, wherein the particular timeslot is associated with a first channel and the link is not associated with other timeslots associated with the first channel, and the additional information linked by the link is not displayed on the viewing screen in response to the first user input; and a processor, operationally connected to the client device and configured to display program information from the displayed timeslots on the viewing screen in response to the first user input and to display the additional information linked by the link on the viewing screen upon receiving a second user input while the program information of the particular timeslot is displayed.

22. A computer-readable storage medium including instructions for:

receiving electronic program guide data at a receiver from a datastream, the electronic program guide data divided into a plurality of channels and a plurality of timeslots associated with each channel, each timeslot containing program information, the timeslots comprising:

current timeslots containing program information corresponding to programs being broadcast currently; and future timeslots containing program information corresponding to programs scheduled for future broadcasts;

receiving a first user input requesting a display of an electronic programming guide;

in response to the first user input, outputting a first signal from the receiver to a display device, the first signal causing the display device to display the program information in timeslots displayed on a viewing screen of the display device;

providing a link to additional information, the link associated with the program information of a particular timeslot displayed on the viewing screen, wherein the particular timeslot is associated with a first channel and the link is not associated with other timeslots associated with the first channel, and the additional information linked by the link is not displayed on the viewing screen in response to the first user input;

receiving a second user input selecting the link to additional information; and in response to the second user input, outputting a second signal from the receiver to the display device, the second signal causing the display device to display the additional information on the viewing screen while displaying the program information of the particular timeslot.

23. A method of providing information for display on a viewing screen, the method comprising:

receiving electronic program guide data at a receiver from a datastream, the electronic program guide data divided into a plurality of channels and a plurality of timeslots associated with each channel, each timeslot containing program information corresponding to programs being broadcast currently and programs scheduled for future broadcasts;

receiving a first user input requesting a display of the program information;

in response to the first user input, outputting a first signal from the receiver to a display device, the first signal causing the display device to display the program information in timeslots displayed on a viewing screen of the display device;

providing a link to additional information, the link associated with program information of a particular timeslot displayed on the viewing screen, wherein the particular timeslot is associated with a first channel and the link is not associated with other timeslots associated with the first channel, and the additional information linked by the link is not displayed on the viewing screen in response to the first user input;

receiving a second user input selecting the link to additional information; and in response to the second user input, outputting a second signal from the receiver to the display device, the second signal causing the display device to display the additional information linked by the link on the viewing screen while displaying the program information of the particular timeslot.

24. The method of claim 23, wherein associating the additional information with the program information comprises linking the additional information with a particular program.

\* \* \* \* \*